United States Patent [19]

Zeunen

[11] 4,302,103
[45] Nov. 24, 1981

[54] PRECISION CONTACT PRINTER

[76] Inventor: Barthel Zeunen, 215 E. 12 Mile Rd., Madison Heights, Mich. 48071

[21] Appl. No.: 168,086

[22] Filed: Jul. 14, 1980

[51] Int. Cl.³ .................... G03B 27/10; G03B 27/20
[52] U.S. Cl. ............................. 355/84; 355/91; 355/103
[58] Field of Search .................... 355/84, 91–94, 355/99, 97, 103, 102, 108–111

[56] References Cited

U.S. PATENT DOCUMENTS

| | | | |
|---|---|---|---|
| Re. 28,770 | 4/1976 | Zeunen et al. | 355/84 |
| 2,518,208 | 8/1950 | Weiss | 355/84 |
| 3,687,548 | 8/1972 | Yugoro | 355/91 X |
| 4,212,533 | 7/1980 | Zeunen | 355/91 |

Primary Examiner—L. T. Hix
Assistant Examiner—W. J. Brady
Attorney, Agent, or Firm—Cullen, Sloman, Cantor, Grauer, Scott & Rutherford

[57] ABSTRACT

A contact printer, for exposing light sensitive sheets to relatively large size drawings and the like for making accurate duplications, is formed of an endless, movable, support belt having a flat support surface which is overlapped by a movable transparent belt. The drawing and sheet are overlapped and fed between and move in a longitudinal direction with the two belts. The overlapping portions of the transparent belt, the drawing and sheet are all flattened and tightly clamped together against the flat support surface by a vacuum system. Such system includes closely spaced, transversely extending, grooves formed in the surface of the support belt. The grooves open endwise into longitudinally extending border portions which are formed along the side edges of the support belt. A row of holes through at least one of the border portions passes over a vacuum chamber. Thus, air is evacuated through the grooves and out through the holes to the chamber. A fixed position light source is arranged to shine light through the transparent belt to expose the portion of the light sensitive sheet material which is clamped to the moving support surface.

9 Claims, 5 Drawing Figures

U.S. Patent  Nov. 24, 1981  4,302,103
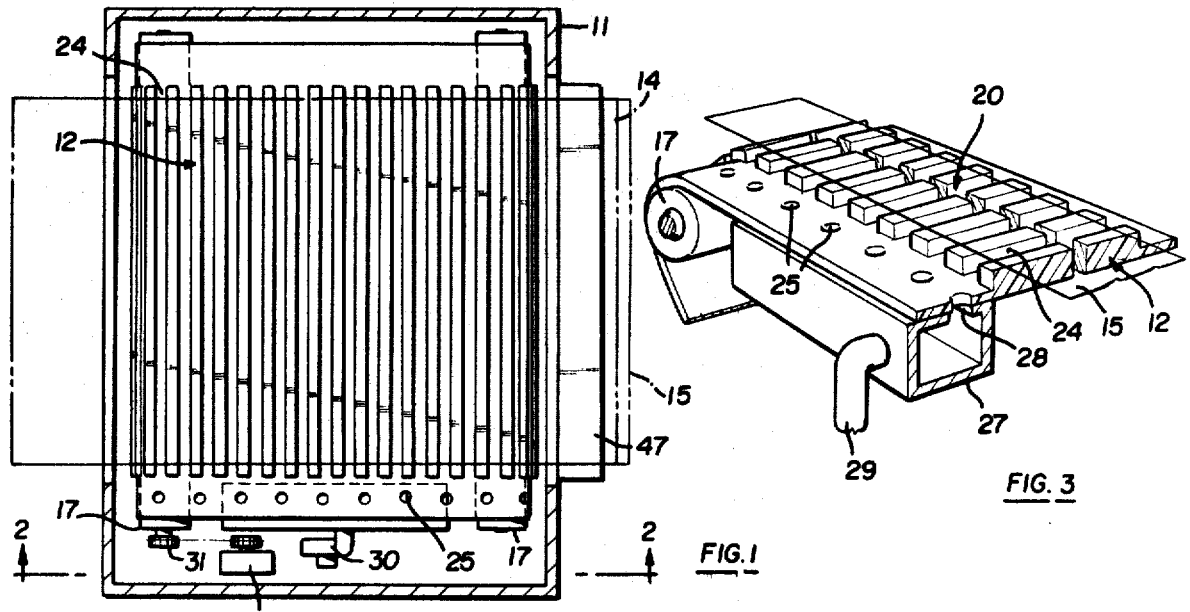
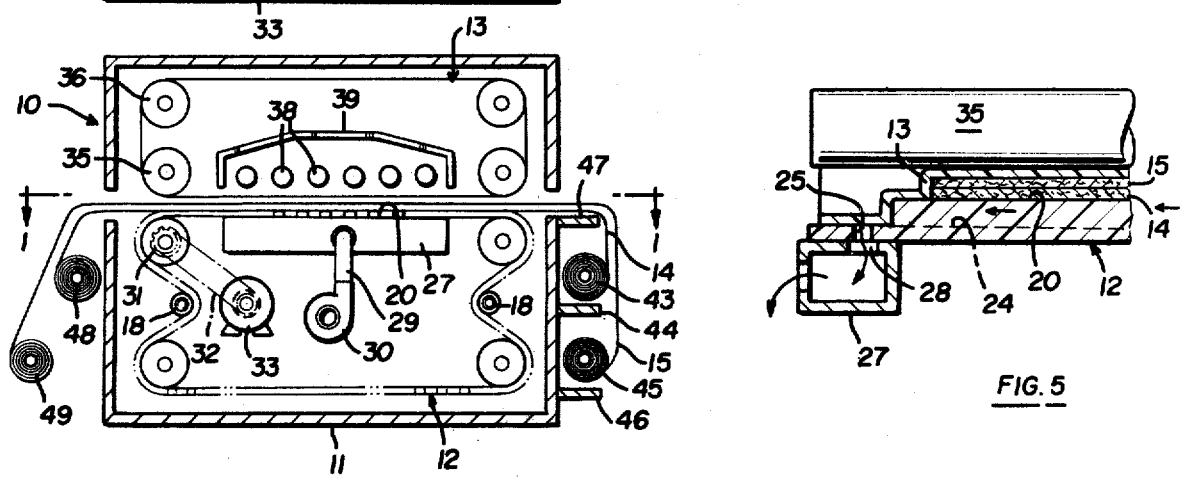
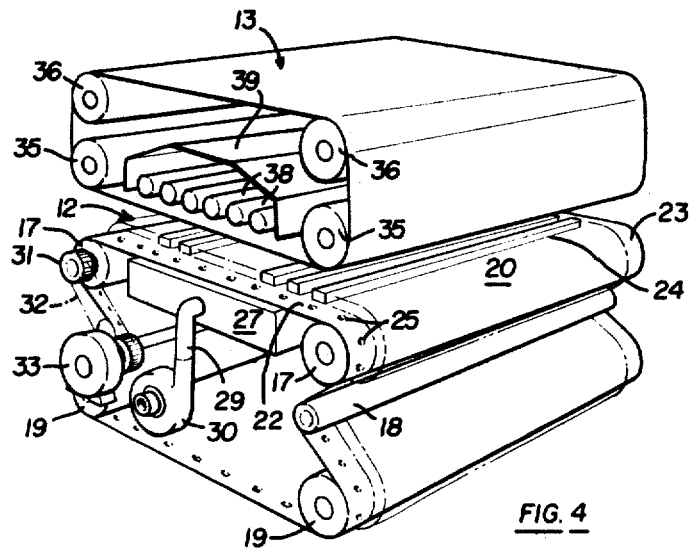

PRECISION CONTACT PRINTER

BACKGROUND OF INVENTION

The invention herein relates to a contact printer for use in reproducing precise duplicates of very large size drawings, which are engineered to exact final part size, and the like. In a number of different industrial or manufacturing procedures, i.e., product engineering, very large size, non-dimensioned drawings are used as tools from which templates, fixtures and so forth are made for final tooling. Non-dimensioned drawings are also used for sight gauges, industrial closed circuit numerical controls, and automatic drafting. For example, loft drawings used to lay out aircraft parts, ship parts and the like and automotive body drawings are typical of large size drawings which may be on the order of up to forty or even more feet in length and up to six feet in width and which are precisely drawn, but not dimensioned. In the manufacturing processes utilizing such drawings, the various parts are depicted on the drawing but are not dimensioned.

In the use of non-dimensioned drawings, the making of full size copies of the drawings is difficult because of the sizes involved. Moreover, it is difficult to make precision copies, i.e., copies that are precisely accurate reproductions of the original so that the copies may likewise be utilized for scaling purposes.

In the making of duplicates of original large size drawings, various copying techniques, including various photographic techniques have been used which utilize contact printing. That is, either photographic or other light sensitive film or sheet is placed in direct contact with the original drawing and the appropriate light is exposed upon the surfaces. The exposed film or sheet is thereafter processed, as for example by photographic development or the like, to produce the precision duplicate.

Ordinary reproducing machines or photcopy machines are not sufficiently accurate for reproductions of large size non-dimensioned drawings. Hence, in the past equipment has been used which, in essence, spreads out the original drawing in a flat stationary plane with the light sensitive film or sheet either above or below it, depending upon the process utilized. Then, a light source has been moved along the upper exposed surface, to shine the light in a manner such as to expose the film so that it may be processed into a finished copy. In certain of these processes, the photosensitive or light sensitive film or sheet is located below the drawing so that the light shining through the drawing exposes the sheet. In other processes, the light sensitive film or sheet is arranged above the drawing and by a bounce-back light arrangement, the copy is produced.

In the systems where the drawing and sheet are layed flat, upon a flat surface, a large size table-like support is needed. For example, a forty foot long drawing requires a support table of that length. Consequently, the equipment utilized for making drawings of this character ordinarily is very large and requires a great deal of building space. In addition, the equipment is relatively cumbersome to use and requires a considerable amount of labor and time to produce the required copies.

An example of a long, flat bed printer is illustrated in my prior patent U.S. Pat. No. Re. 28,770, reissued Apr. 13, 1976 for a photographic exposure apparatus, the original patent number being U.S. Pat. No. 3,723,001 issued Mar. 27, 1973. Other examples of conventional flat type printers are illustrated in U.S. Pat. No. 2,427,923 issued to Reynolds on Sept. 23, 1947 for an apparatus for printing on light sensitive material. Other patents showing similar types of flat bed contact printers are illustrated in U.S. Pat. No. 2,919,635 to Levine on Jan. 5, 1960 for "Printing Exposure Machine for Photosensitive Materials", U.S. Pat. No. 2,988,979 issued to Siegler on June 20, 1961 for "Exposure Apparatus for Photosensitive Materials", U.S. Pat. No. 4,182,569 issued to Smith on Jan. 8, 1980 for a lithographic dual light source apparatus, and British Pat. No. 1,116,151 published June 6, 1968 for improvements in photomechanical printing apparatus invented by Milborne.

Efforts have been made to eliminate the large size support tables and instead to utilize a roll type system where the drawing and sensitized sheet are moved through more compact equipment. However, where rollers have been used the curvature of the sheet around the rollers tends to produce inaccuracies which increase depending upon the length of the sheet. Thus, systems whereby the sheet or drawing are curved during the light exposure are not satisfactory to produce precision drawings.

Thus, in my prior application, Ser. No. 010,628 filed Feb. 9, 1979 now U.S. Pat. No. 4,212,533 for a "Photographic Exposure Apparatus", I disclose a compact contact printer which utilizes a belt support system upon which overlapped sensitized sheets and drawings may be fed for movement beneath stationary light sources. A vacuum system is provided to clamp the drawing and sheets together during the light exposure.

Vacuum systems, as well as various types of electrostatic systems have been used in the prior, long flat table type of exposure units. However, the prior vacuum systems, as well as the electrostatic systems for holding the sheet and drawing together during exposure, have not been adequate in a compact form of equipment.

Examples of similar types of contact printing equipment which utilize electrostatic means for holding the sheet and drawing together, as contrasted with the above mentioned patents which for the most part utilize vacuum systems for that purpose, are illustrated in U.S. Pat. No. 3,844,657 issued Oct. 29, 1974 to Schweriner for a "Contact Printing Apparatus and Method" and in U.S. Pat. No. 3,888,586 issued to Arden and Schweriner on June 10, 1975 for a "Contact Printing Apparatus with Electrostatic Hold Down".

In the equipment of my above mentioned application, the vacuum system utilized is relatively expensive, utilizing a perforated support belt beneath which a vacuum source is positioned for holding the sheet and drawing upon the support belt during exposure times.

Thus, the invention of this present application relates to a vacuum system support belt which is relatively inexpensive and efficient to rapidly flatten out the drawing and sheet, i.e., to eliminate bends or curves or wrinkles therein, and to hold the sheets in flat condition, and in tight surface to surface contact, during exposure thereof. In my prior system, although the sheet and drawing are held in tight contact, flattening out the sheet and drawing in certain instances is relatively difficult. Thus, the present invention relates to an improvement over my prior printer.

SUMMARY OF INVENTION

The invention herein contemplates a contact printer using a bottom support, endless belt having transverse grooves, through which air is sucked transversely or sidewise, from a flat, support surface formed by the upper reach of the belt. The light sensitive sheet or film and the drawing or the like are fed upon the belt and the belt is moved longitudinally so as to advance the sheet together in a longitudinal direction. A transparent clamping belt has a lower reach in contact with and likewise vacuum forced against the sheet and drawing and against the flat support surface portion of the support belt to ensure tight, wrinkle and bulge free contact between the sheet and drawing.

A fixed position light source, such as a number of bulbs within a reflectorized housing, is located above the transparent clamping belt so as to shine light upon the sheet and drawing as they are belt moved longitudinally.

Significantly, the support belt is provided with edge border portions into which the grooves open sidewise. At least one of the border portions is provided with holes or openings which communicate with a vacuum chamber located beneath the belt. Thus, the air sucked sideways through the channels passes through the openings in the border and into the vacuum providing chamber. This anchors the clamping sheet along one edge, directly to the flat support surface of the support belt and tends to anchor more securely the edges of the sheet and drawing which are nearest to that border portion. Consequently, the sheet and drawing and also, the clamping belt, tend to spread sideways towards the opposite edge of the belt to completely flatten out and eliminate wrinkles, bulges and the like.

The invention contemplates utilizing a second vacuum system on the opposite side of the belt, including holes through the belt for evacuating air from both sides of the belt in order to speed up the process. By longitudinally offsetting the holes on each side of the belt, there is a tendancy to spread or flatten the sheet and drawing against wrinkling, although the preferred technique is to utilize the vacuum system on one side of the belt only for most relatively thin drawings and sensitized sheets.

Thus, an object of this invention is to provide a contact printer suitable for producing precision reproductions of large size, non-dimensioned, precision drawings by incrementally feeding the drawing and a sensitized sheet beneath a fixed light source while clamped between two belts. The lower belt includes transverse channels for sidewise excavation of air to thereby clamp the sheet, drawing and the upper belt to the lower belt. A significant object of the apparatus herein is to provide equipment and a vacuum hold down system which will flatten the sheet, drawing and clamping belt to maintain precise registry. This eliminates inaccuracies caused by separations or curvings of the material.

Still another object of this invention is to provide a contact printer which is small in size so as to permit a substantial reduction in required floor space and building area for contact printing large size drawings. The apparatus may be much wider, i.e., in a transverse direction, than it is long, i.e., in a longitudinal direction. The sheet and drawing may be rolled up and fed through the apparatus, as compared to the prior devices which necessitated spreading the sheet and drawing out to the full length for reproduction purposes.

Yet another object of this invention is to provide a simplified support belt construction which efficiently and very effectively provides the needed vacuum hold down system for both spreading out, flattening, and holding in tight fact to fact contact, the light sensitive sheet and the drawing to be reproduced.

These and other objects and advantages of this invention will become apparent, upon reading the following description, of which the attached drawings form a part.

DESCRIPTION OF DRAWINGS

FIG. 1 is a plan view, taken in the direction of arrows 1—1 of FIG. 2 of the support belt and lower portion of the equipment.

FIG. 2 is a cross sectional, elevational view of a contact printer, taken in the direction of arrows 2—2 of FIG. 1.

FIG. 3 is a schematic, fragmentary, perspective view of a portion of the support belt.

FIG. 4 is a perspective view of the support belt and the clamping belt, spaced apart, to show their relative relationships.

FIG. 5 is an enlarged, cross sectional, fragmentary view of one edge of the support belt with the sheet, drawing and clamping belt illustrated in position thereon.

DETAILED DESCRIPTION

Referring to the drawings, the contact printer, generally designated as 10, comprises a suitable box-like housing 11 within which are contained a lower, endless support belt 12 and a vertically aligned, upper, endless transparent, clamping belt 13. A light sensitive sheet, such as photographically sensitive film or other appropriately treated sheet material 14 is moved through the housing along with a large size drawing 15. The drawing must be of the loft, body, or other large size non-dimensional type from which dimensions will be employed and from which precise reproductions are required for industrial manufacturing purposes.

The lower endless support belt 12 is supported upon rollers 17 at its opposite ends. Beneath these rollers are intermediate, adjustable rollers 18 which may be moved inwardly or outwardly to adjust the tension of the belt. Beneath these rollers are lower support rollers 19. The rollers together form the belt in a manner that provides a flat, upper support surface 20.

The means for mounting the rollers within the housing are conventional, such as conventional bearings and the like. Also, the means for adjusting the intermediate rollers 18 are also conventional. Thus, the rollers are illustrated schematically, omitting the conventional supports, bearings and the like.

Depending upon the size of the flat support surface, additional intermediate rollers may be located within the plane tangent to the upper surface of the end roller 17 to provide line supports at spaced apart lines beneath the surface of the flat support portion 20. For illustration purposes, these additional rollers are omitted.

The belt 12 includes borders 22 and 23 which are narrow edge portions extending longitudinally of the belt, as illustrated in FIG. 4. The belt is also provided with narrow, closely spaced apart grooves 24 whose bottoms are approximately coplanar with the surfaces of the borders 22 and 23. Thus, the grooves open endwise into the border portions of the belt.

A row of holes 25 are formed in one of the borders. For some purposes, a row of holes may also be formed in the opposite border. However, for illustration purposes, the illustrated and preferred embodiment are shown in FIG. 4 where the holes are formed in only one of the borders.

A vacuum chamber 27 is located beneath the area of the holes and is provided with a slot 28 which registers with the holes (see FIG. 5). A vacuum line 29 from the chamber leads to a conventional vacuum pump 30 which continuously evacuates air from the vacuum chamber or duct. As a result, air is evacuated sideways from the channels and downwardly through the holes 25 into the vacuum chamber 27 when the belt support surface is covered by the transparent belt 12 and the drawing 15 and sheet or film 14.

The support belt is driven so that it moves longitudinally. By way of illustration, the driving means comprises a drive shaft 31 secured to one of the end rollers 17. A drive chain 32 connects the drive shaft to a conventional electrical motor 33 so as to continuously drive the roller 17 and thereby move the belt at a continuous speed. The speed of rotation can be pre-set depending upon how long the film is to remain beneath the light source for exposure.

The upper belt 13 is supported upon opposite lower end rollers 35 and upper end rollers 36 which are appropriately journalled to the housing. The belt may be independently driven by its own motor, but at the same speed as the movement of the lower, support belt. Alternatively, the upper belt may be driven by the movement of the support belt to simplify the drive mechanism.

Light bulbs or light sources 38 are located between the upper and lower reaches of the transparent belt 13. Suitable light reflector housings 39 support the bulbs within the space between the reaches of the belt. Thus, the light shines downwardly through the bottom reach of the transparent belt towards the support belt support surface.

As shown in FIG. 2, the film or sheet 14 may be of considerable length, such as many feet in length and thereby is rolled into a roll formation 43 which is rested upon a suitable shelf or box 44 attached to the housing.

The drawings 15 may also be rolled at 45 and rested upon a lower shelf or box support 46. In operation, the machine operator grasps the leading edge of the drawing and registers or aligns it with the leading edge of the film or sheet 14 and inserts it into the space between the upper and lower belts. To assist in registering the sheet and drawing, a suitable shelf 47 may be located at the entrance to the space between the upper and lower belts. Once the sheet and drawing are aligned and fed into the space between the belts, the two move together with the belts because of the motor driven operation of the lower support belt.

The aligned sheet and drawing are carried by the upper reach of the support belt in a flat plane due to the flat support surface formed by the belt. Meanwhile, the vacuum system evacuates air from beneath the sheet and drawing and cause these to tightly contact each other and to tightly lock against the upper surface of the belt. The vacuum system further causes the lower reach of the transparent clamping belt to tightly engage the drawing or sheet, whichever is above, and its edges contact the exposed edge portions of the support belt, as illustrated in FIG. 5. Actually, FIG. 5 considerably exaggerates bending of the side edges of a transparent clamping belt in contact with the side edges of the support belt in order to better illustrate the action that takes place due to the vacuum system.

Because of the vacuum arrangement at one side of the belts, the transparent lower reach of the clamping belt is anchored along the one edge of the lower belt. The sheet and drawing likewise tend to be more tightly anchored along their edges, which are nearest to the holes 25. Therefore, all four, i.e., the transparent sheet, the drawing, the sensitized reproduction material and the belt, tend to spread or slide toward the opposite border to completely flatten out bulges or wrinkles.

Where the opposite border is also provided with holes and with a second vacuum system, identical to the first one, a similar tight contact effect is obtained, but there is no sidewise sliding of the sheet and drawing because they are anchored on both sides. Nevertheless, the flattening takes place where there is little original bulging or wrinkling, such as with a thicker gauge material.

When the leading edges of the sheet and drawing exit from the equipment, they are re-rolled into a roll of film or sheet 48 and a roll of drawing 49. The film or sheet is then taken to a processing unit for developing. Various types of developing techniques are used, including photographic, diazo etc. The developing techniques utilized are immaterial to the invention herein which concerns the contact printer or exposure apparatus only.

Although the sizes of the various components may vary considerably, examples of appropriate sizes are as follows: the belt may be on the order of five feet wide with grooves that are approximately 1/16 inch wide and 1/16 inch deep with a pitch between grooves of ⅜ of an inch. The support belt may be on the order of ⅛ to 3/16 of an inch thick and made of either laminated leather or of flexible plastic material.

The transparent clamping belt may be made of a flexible polyester film which is commercially available and comes in a thickness of about three to seven thousandths of an inch. The polyester can be obtained clear, i.e., without pigmentation so that light can easily pass through it.

The sensitized photographic film utilized must be a polyester film of roughly the same thickness as the clear or transparent belt, that is, around three to seven thousandths of an inch. The film or sensitized material is precoated with appropriate chemicals for its intended development into a finished drawing.

As can be seen, the unit is compact, preferably being much wider than it is deep. Yet it provides a solid, tight, flat support for the film and the drawing to produce a precision reproduction. Since the film and drawing are rolled up, except for the relatively short length thereof which passes through the apparatus, i.e., somewhat on the order of three feet or so, the equipment is considerably shorter than and requires much less overall building room, than prior printers.

Having fully described an operative embodiment of this invention, I now claim:

1. A precision contact printer for exposing a light sensitive sheet to an elongated, wide drawing and the like, comprising:

an endless, support belt, made of an air impervious, flexible material, having a reach forming a flat support surface upon which the sheet and the drawing are positioned in overlapping contact;

a clamping belt overlapping said support surface for holding the drawing and sheet together upon said support surface;

said clamping belt being transparent, and light sources arranged for shining light through the clamping belt for exposing the sheet portion located upon the support surface;

said support belt having narrow edge border portions extending the length thereof and closely spaced channels extending transversely of the belt between the opposite border portions;

a row of spaced apart holes formed in at least one of the border portions, with the row extending along the length of the belt, and the holes being close to the adjacent ends of the channels;

a vacuum chamber aligned with the row of holes at said border portion at the surface of the support belt reach which is opposite said support surface, for removing air through the holes and from the belt channels when the channels are overlapped by the clamping belt;

and drive means for moving the support belt longitudinally;

whereby an elongated strip of light sensitive sheet material, overlapped by an elongated drawing and the like are fed between the support belt and clamping belt and are longitudinally moved therebetween by the longitudinal movement of the belts, while air is removed from the channels formed in the support surface of the support belt to thereby tightly clamp, in surface to surface contact, the clamping belt, drawing and film upon the support surface so that light shining through the clamping belt exposes the sheet for thereby reproducing a precision duplicate of the drawing.

2. A contact printer as defined in claim 1, and the width of the clamping belt being sufficient to overlap both of the opposite borders of the support belt, and the support belt support surface extending between said borders;

and the width of the support belt portion containing said channels being wider than the width of the sheet and drawing, wherein the opposite edges of the clamping belt directly contact the border portions of the support belt.

3. A contact printer as defined in claim 2, and including holes formed in the opposite border portion, and a second vacuum chamber overlapped by said opposite border portion, wherein the holes therein communicate with the second vacuum chamber so as to evacuate air from the channels at each of the opposite edges of the support belt.

4. A contact printer as defined in claim 2, and with the opposite border portion of the support belt being air impervious so that the clamping belt, drawing and sheet tend to slide, within their own planes, towards said opposite border portion for flattening any curves, bulges and creases in same, while anchoring the clamping belt to the support belt along the border portions having the holes therein.

5. In a precision contact printer for incrementally exposing an elongated light sensitive sheet to an elongated drawing and the like to produce an accurate reproduction, and including a lower, endless, movable support belt having its upper reach forming a flat support surface, and an upper transparent belt overlapping the support surface for feeding the overlapped sheet and drawing between the belts for moving longitudinally with the belts, and a fixed position light source arranged for shining light through the transparent belt for exposing the sheet portion which is located upon the flat support surface of the support belt, and a vacuum system for tightly clamping together the transparent belt, drawing, sensitized reproduction sheet and support surface, the improvement comprising:

longitudinally extending border portions formed on the opposite edges of the exposed surface of the support belt, and transversely extending, closely spaced apart grooves formed in the belt between the border portions, with the grooves opening endwise to one of the border portions;

air passageways formed in one of said border portions adjacent the grooved ends;

a vacuum chamber underlying said one border portion of the belt and communicating with the air passages formed therein;

whereby air is evacuated transversely of the belt, through the grooves, so that the transparent belt, drawing and sheet are flattened and tightly clamped together while the sheet is exposed to the light.

6. In a contact printer as defined in claim 5 and wherein the opposite ends of the grooves open into the opposite belt border portion;

air passageways formed through said opposite border portion and communicating with a second vacuum chamber for evacuating air from both ends of the channels.

7. In a contact printer as defined in claim 6 and with the passageways through one of the border portions being offset longitudinally relative to the passageways in the opposite border portion.

8. In a contact printer as defined in claim 5 and said transparent belt being of a width to overlap the grooves and the immediate adjacent areas of the border portions, including the air passageways, and wherein the width of the support belt grooved portion located between its border portions is substantially greater than the width of the sheet and drawing so that the transparent belt portions are normally directly in contact with the support belt border portions beyond the opposite edges of the sheet and drawing.

9. In a contact printer as defined in claim 8, and said sheet and drawing being many times longer than the longitudinal length of the support belt support surface portion so as to incrementally feed relatively small portions of the drawing and sheet under the light source at the speed of the moving belts to thereby incrementally expose the full length of the sheet and drawing to the light source.

* * * * *